United States Patent [19]

McCready et al.

[11] Patent Number: 4,740,565

[45] Date of Patent: Apr. 26, 1988

[54] THERMOPLASTIC POLYETHERIMIDE ESTER POLYMERS EXHIBITING IMPROVED FLEXULAR PROPERTIES

[75] Inventors: Russell J. McCready; John A. Tyrell, both of Mt. Vernon, Ind.

[73] Assignee: General Electric Company, Pittsfield, Mass.

[21] Appl. No.: 936,694

[22] Filed: Dec. 2, 1986

[51] Int. Cl.$^4$ .............................................. C08G 8/00
[52] U.S. Cl. .................................... 525/437; 528/289; 528/296
[58] Field of Search ................ 525/437; 528/289, 296

[56] References Cited

U.S. PATENT DOCUMENTS

| | | | |
|---|---|---|---|
| 4,371,692 | 2/1983 | Wolfe | 528/289 |
| 4,371,693 | 2/1983 | Wolfe | 528/292 |
| 4,556,688 | 12/1985 | McCready et al. | 525/33 |
| 4,556,705 | 12/1985 | McCready | 528/289 |
| 4,569,973 | 2/1986 | Tyrell et al. | 525/437 |

Primary Examiner—Lucille M. Phynes

[57] ABSTRACT

A thermoplastic polyetherimide ester polymer comprising the reaction products of:
  (i) a diol component comprised of at least one low molecular weight diol and at least one high molecular weight hydroxy terminated polylactone;
  (ii) at least one dicarboxylic acid or an ester forming reactive derivative thereof; and
    (a) (1) at least one high molecular weight poly(oxy alkylene)diamine, and (2) at least one tricarboxylic acid or its derivative, or
    (b) at least one high molecular weight polyoxyalkylene diimide diacid.

These polymers exhibit improved flexibility, i.e., a low flexural modulus. The diol component contains an amount of high molecular weight hydroxy terminated polylactone at least effective to improve the flexibility of the polymer.

45 Claims, No Drawings

THERMOPLASTIC POLYETHERIMIDE ESTER POLYMERS EXHIBITING IMPROVED FLEXULAR PROPERTIES

BACKGROUND OF THE INVENTION

Poly(etherimide ester) polymers comprised of the reaction products of (a) a low molecular weight diol, (b) a dicarboxylic acid, (c) a high molecular weight poly(oxy alkylene)diamine, and (d) a tricarboxylic acid or its derivatives are known and are described in U.S. Pat. Nos. 4,544,734 and 4,556,705 to McCready and in U.S. Pat. No. 4,556,688 to McCready et al. These poly(etherimide ester) polymers exhibit excellent stress-strain properties, low tensile set, high melting temperatures and/or excellent strength/toughness characteristics as well as good flexibility which render them especially suitable for molding and extrusion applications.

It has now been discovered that poly(etherimide ester)polymers can be provided which exhibit lower flexural modulus and better flexibility than conventional presently available poly(etherimide ester)polymers. These poly(etherimide ester)polymers exhibiting these improved flexural properties are obtained by the utilization of a diol component which is comprised of at least one one high molecular weight hydroxy terminated polylactone.

SUMMARY OF THE INVENTION

The instant invention is directed to thermoplastic elastomeric polyetherimide esters exhibiting improved or upgraded flexural properties comprising the reaction products of (a) a diol component containing at least one high molecular weight hydroxy terminated polylactone, (b) at least one dicarboxylic acid or an ester forming reactive derivative thereof, (c) at least one high molecular weight poly(oxy alkylene)diamine, and (d) at least one tricarboxylic acid having two vicinal carboxyl groups or the anhydride thereof.

DESCRIPTION OF THE INVENTION

In accordance with the instant invention there are provided thermoplastic poly(etherimide ester) polyemrs exhibiting improved or exceptionally good flexural properties. The polyetherimide esters of the present invention, while exhibiting improved flexibility, i.e., low flexural modulus, also exhibit, to a substantial degree, substantially most of the advantageous properties of conventional poly(etherimide ester) polymers which are derived from (a) a low molecular weight diol, (b) a dicarboxylic acid or its ester forming reactive derivative, (c) a high molecular weight poly(oxy alkylene)diamine. and (d) a tricarboxylic acid or its derivative. The instant polymers also exhibit improved thermal properties, e.g., thermal stability.

The poly(etherimide ester) polymers of the instant invention are comprised of the reaction products of:

(a) a diol component comprised of at least one low molecular weight diol and at least one high molecular weight hydroxy terminated polylactone;

(b) at least one dicarboxylic acid or an ester forming reactive derivative thereof;

(c) at least one high molecular weight poly (oxy alkylene)diamine; and (d) at least one tricarboxylic acid or its derivative.

The low molecular weight diols which form one part of the diol component (a) and which are suitable for use in preparing the polymers of the present invention include the saturated and unsaturated aliphatic and cycloaliphatic dihydroxy compounds as well as the aromatic dihydroxy compounds. These diols are of a low molecular weight, i.e., having an average molecular weight of about 250 or less. When used herein the term "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic low molecular weight diols are those having from 2 to about 19 carbon atoms. Exemplary of these diols there may be given ethylene glycol, propanediol, 1,4-butanediol, pentanediol, 2-methyl propanediol, 2,2-dimethyl propanediol, hexanediol, decanediol, 1,2-cyclohexane dimethanol, 1,3-cyclohexane dimethanol, 1,4-cyclohexane dimethanol, butenediol, hexenediol, and the like. Preferred are 1,4-butanediol and mixtures thereof with hexanediol, butenediol, or cyclohexane dimethanol.

Aromatic diols suitable for use herein are generally those having from 6 to about 15 carbon atoms. Included among these low molecular weight aromatic dihydroxy compounds are resorcinol, hydroquinone, 1,5-dihydroxy naphthalene, 4,4'-dihydroxy diphenyl, bis(p-hydroxy phenyl)methane, and 2,2-bis (4-hydroxy phenyl) propane.

Especially preferred low molecular weight diols are the saturated aliphatic diols, mixtures thereof, and mixtures of a saturated diol(s) with an unsaturated diol(s), wherein each diol contains from 2 to about 8 carbon atoms. Where more than one diol is employed, its is generally preferred that at least about 60 mole percent, based on the total low molecular weight diol content, be the same low molecular weight diol, more preferably at least about 80 mole percent. Particularly useful compositions are those wherein the low molecular weight diol is 1,4-butanediol, either alone or in admixture with another low molecular weight diol such as butenediol, hexanediol, or cyclohexane dimethanol.

The high molecular weight hydroxy terminated polylactones which comprise the second component of the diol mixture (a) are well known in the art and are generally commercially available or may be readily prepared by known and conventional processes. These hydroxy terminated polylactones have an average molecular weight of at least about 400, preferably at least about 600, and more preferably at least about 900. They may have average molecular weights as high as about 12,000, preferably 10,000, and more perferably 4,000.

These hydroxy terminated polylactones may be represented by the general formula

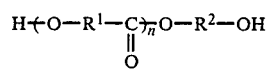

wherein:

$R^1$ is a divalent aliphatic hydrocarbon radical;
$R^2$ is a divalent aliphatic hydrocarbon radical; and
n has a value of greater than at least 2.

The divalent aliphatic hydrocarbon radicals represented by $R^1$ are preferably the alkylene radicals, with those alkylene radicals containing from 2 to about 10 carbon atoms being preferred.

The divalent aliphatic hydrocarbon radicals represented by $R^2$ are selected from alkylene, alkylidene, alkenylene, cycloalkylene, and cycloalkylidene radicals, with the saturated divalent aliphatic hydrocarbon radicals being preferred, The preferred alkylene and alkylidene radicals represented by $R^2$ are those containing from 2 to about 8 carbon atoms. The preferred cycloalkylene and cycloalkylidene radicals are those containing from about 4 to about 8 ring carbon atoms.

The letter n has a value of at least greater than 2. The value of n will depend upon the molecular weight of the dihydroxy terminated polylactone. Thus, n will be such that the polylactone has an average molecular weight of at least about 400, preferably at least about 600, and more preferably at least about 900. Obviously, if $R^1$ is a short chain alkylene radical n will be greater than if $R^1$ is a long chain alkylene radical in order to meet these minimum molecular weight requirements.

The dihydroxy terminated polylactones of the present invention may be conveniently prepared by the self reaction of at least one lactone. These lactones may be represented by the formula

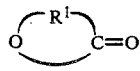   II.

wherein $R^1$ is as defined hereinafore. In the self reaction of these lactones a diol initiator is present. This diol initiator reacts with the lactone and in effect "opens the ring". This diol may be represented by the general formula

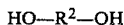   III.

wherein $R^2$ is as defined hereinafore. The diol also acts as an end-group forming reactant.

It is to be understood that $R^1$ may be a straight chain alkylene radical or a branched alkylene radical. The same holds true for $R^2$ when $R^2$ is an alkylene radical.

Mixtures of two or more different high molecular weight hydroxy terminated polylactones as well as individual hydroxy terminated polylactones may be used in the practice of the present invention.

The lactones of Formula II are well known in the art and are amply described in the literature, for example, in Roberts and Caserio, Basic Principles of Organic Chemistry, W. A. Benjamin, Inc., New York, N.Y., 1964, pp. 546-547. The polylactones, as well as methods for their preperation, are likewise well known in the art and amply described in the literature, for example, in Billmeyer, Jr., Textbook of Polymer Science, Interscience Publishers, New York, N.Y., 1966, pp. 260-261.

A preferred polylactone is polycaprolactone which is derived from caprolactone.

The instant diol mixtures of the low molecular weight diol and the high molecular weight hydroxy terminated polylactone contain an amount of polylactone which is at least effective to improve the flexibility, i.e., lower the flexural modulus, of the polyetherimide ester polymer. Generally, this amount is at least about 3 weight percent, preferably at least about 5 weight percent, and more preferably at least about 10 weight percent. Weight percent of polylactone is based on the total amounts, by weight, of the low molecular weight diol and pollactone present in the diol component (a). In general, about 75 weight percent of polylactone should not be exceeded, preferably about 60 weight percent, and more preferably about 50 weight percent.

In general, if less than about 3 weight percent of the polylactone is present there will be no appreciable improvement in the flexural properties, i.e., flexibility, of the polymer. On the other hand, if more than about 75 weight percent of the high molecular weight polylactone is present in the diol component or mixture (a) the flexural modulus of the polymer will be lowered to such an extent that some difficulties may be experienced in injection molding processes.

The dicarboxylic acids (b) which are suitable for use in the practice of the present invention are the aliphatic, cycloaliphatic, and/or the aromatic dicarboxylic acids. These dicarboxylic acids are preferably of a low molecular weight, i.e, having a molecular weight of less than about 300. However, higher molecular weight dicarboxylic acids may sometimes be used. The term "dicarboxylic acids" as used herein, includes the equivalents of dicarboxylic acids having two functional carboxyl groups, which groups perform substantially like the dicarboxylic acids in their reaction with the glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —$SO_2$—.

Representative aliphatic and cycloaliphatic acids which can be used for this invention are sebacic acid, 1,2-cyclohexane dicarboxylic acid; 1,3-cyclohexane dicarboxylic acid; 1,4-cyclohexane dicarboxylic acid; adipic acid; glutaric acid; succinic acid; oxalic acid; azelaic acid; diethylmalonic acid; allylmalonic acid; dimer acid; 4-cyclohexene 1,2- dicarboxylic acid; 2-ethylsuberic acid; tetramethylsuccinic acid; cyclopentanedicarboxylic acid; decahydro-1,5 naphthalene dicarboxylic acid; 4,4'-bicyclohexyl dicarboxylic acid; decahydro-2,6-naphthalene dicarboxylic acid; 4,4 methylenebis(cyclohexane carboxylic acid); 3,4-furan dicarboxylic acid; and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxphenyl) methane, oxybis(benzoic acid), ethylene-1,2-bis-(p-oxybenzoic acid), 1,5 naphthalene dicarboxylic acid, 2,6 naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(beta-hydroxyethoxy) benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic, and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyoxylalkylene diamines (c) suitable for use in the present invention may be characterized by the following formula:

$$H_2N-G-NH_2$$

wherein G is the radical remaining after the removal of the amino groups of a long chain alkylene ether diamine. These polyether diprimary diamines are vailable commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating the glycol with ammonia and hydrogen over a Nickel-Copper-Chromium catalyst as taught by U.S. Pat. No. 3,654,370. Other methods for the production thereof include those taught in U.S. Pat. Nos. 3,155,728 and 3,236,895 and French Pat. Nos. 1,551,605 and 1,466,708. All of the foregoing patents are incorporated herein by reference.

The long chain ether diamines suitable for use herein are polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether) diamines including poly(ethylene ether) diamine, poly(propylene ether) diamine, poly(tetramethylene ether) diamine; random or block copolymers of ethylene oxide and propylene oxide including propylene oxide and poly(propylene oxide) terminated poly(ethylene ether) diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether) diamine, poly (tetramethylene ether) diamine, and the poly(ethylene ether) glycols which are end capped with poly (propylene ether) and/or propylene oxide and subsequently aminated.

In general, the polyoxyalkylene diamines useful within the scope of the instant invention have an average molecular weight of from about 600 to about 12,000, preferably from about 900 to about 4,000.

The tricarboxylic acid (d) may be almost any carboxylic acid anhydride containing an additional carboxylic group or the corresponding acid thereof containing two-imide forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3', 4-diphenyl tricarboxylic anhydride, 3,3', 5-benzophenone tricarboxylic anhydride, 1,3,4-cyclopentane tricarboxylic anhydride, 2,2',3-diphenyl tricarboxylic anhydride, diphenyl sulfone-3,3', 4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials may be represented by the formula

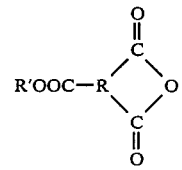

III.

wherein:

R is a trivalent organic radical, preferably a $C_2$–$C_{20}$ aliphatic or cycloaliphatic, or $C_6$–$C_{20}$ aromatic trivalent organic radical; and R' is preferably hydrogen or a monovalent organic radical selected from $C_1$–$C_6$ aliphatic or cycloaliphatic radicals and $C_6$–$C_{12}$ aromatic radicals, e.g., benzyl; most preferably R' is hydrogen.

The amount by which each of the foregoing reactants is employed in the preparation of the polymers of the instant invention is not, in general critical, and depends, in part, upon the desired properties of the resultant polymer. Obviously, sufficient amounts of the diol mixture versus the dicarboxylic acid, and tricarboxylic acid versus diamine must be present, as recognized in the art, to allow for substantially complete polymerization.

In general, the amount of the diol component (a) employed will be a molar equivalent or a molar excess, preferably about 1.5 molar equivalents, based on the combined molar equivalents of dicarboxylic acid (b) and the total moles of tricarboxylic (d). The amount of tricarboxylic acid (d) employed will preferably be about two molar equivalents based on the number of moles of the poly(oxy alkylene)diamine (c). Obviously, less than two molar equivalents would result in incomplete imidization of the diamine resulting in potentially poorer properties. Conversely, greater than two molar equivalents of the tricarboxylic acid (d) may lead to cross-linking and branching of the polymer. Generally, mole ratios of 2 moles of tricarboxylic acid (d) to 0.85 to 1.15 moles of poly (oxy alkylene)diamine (c) yield useful polymers.

The amount by which the diamine (c) and the dicarboxylic acid (b) are used is such that the weight ratio of the theoretical amount of polyoxyalkylene diimide diacid formable from the diamine (c) and the tricarboxylic acid (d) to the dicarboxylic acid (b) is from about 0.05 to about 2.0, preferably from about 0.4 to about 1.4. As described in U.S. Pat. No. 4,556,688, the lower the ratio of the polyoxyalkylene diimide diacid to dicarboxylic acid, the better the strength, crystallization and heat distortion properties of the polymer. Alternatively, the higher the ratio, the better the flexibility, tensile set and low temperature impact characteristics. By the use of the diol mixture of the present invention polyetherimide ester polymers exhibiting better flexibility, i.e., lower flexural modulus, are obtained while keeping the weight ratio of the polyoxyalkylene diimide diacid to dicarboxylic acid within the aforedescribed limits. That is to say, for identical weight ratios of polyoxyalkylene diimide diacid to dicarboxylic acid polymers exhibiting better flexibility are obtained using the diol mixtures of the present invention than by using the low molecular weight diol alone.

This general type of one-pot reaction involving the reaction of (a) a diol, (b) a dicarboxylic acid, (c) a poly(oxy alkylene)diamine, and (d) a tricarboxylic acid is described in U.S. Pat. No. 4,556,688 to McCready et al., incorporated herein by reference.

The instant polyetherimide esters may also be prepared by a two-pot synthesis involving the reaction of (a) the diol mixture of a low molecular weight diol and a high molecular weight hydroxy terminated polylactone, (b) the dicarboxylic acid, and (e) a preformed polyoxyalkylene diimide diacid. Such a general two-pot synthesis is generally described in U.S. Pat. No. 4,566,705 to McCready, incorporated herein by reference. Basically, in this two-pot process the poly(oxy alkylene)diamine (c) is first reacted with the tricarboxylic acid (d) to form a polyoxyalkylene diimide diacid (e), and this preformed polyoxyalkylene diimide diacid is then reacted with the diol mixture (a) and the dicarboxylic acid (b) to form the polyetherimide ester.

The polyoxyalkylene diimide diacid (e) may be represented by the formula

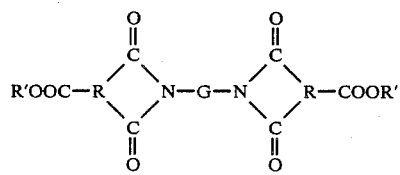

IV.

wherein G, R, and R' are as defined hereinafore.

The polyoxyalkylene diimide diacids of Formula IV suitable for use herein are high molecular weight diimide diacids wherein their average molecular weight is greater than about 700, more preferably greater than about 900. They may be prepared by the imidization reaction involving a tricarboxylic acid containing two vicinal carboxyl groups or an anhydride group and an additional carboxyl group which must be esterifiable with a high molecular weight poly(oxy alkylene)diamine (c). These polyoxyalkylene diimide diacids and processes for their preparation are disclosed in U.S. Pat. 4,556,705, to McCready, incorporated herein by reference. Briefly, these polyoxyalkylene diimide diacids may be prepared by known imidization reactions including melt synthesis or by synthesizing in a solvent system. Such reactions will generally occur at temperatures from 100° C. to 300° C., preferably at from about 150° C. to about 250° C. while drawing off water or in a solvent system at the reflux temperature of the solvent or azeotropic (solvent) mixture.

In this two-pot process, as in the one-pot process, the amounts of the above reactants utilized is generally not critical. However, it is generally preferred that the diol mixture (a) be present in at least a molar equivalent amount, preferably a molar excess, and more preferably at least about 150 mole % based on the moles of dicarboxylic acid (b) and polyoxyalkylene diimide diacid (e) combined. Such molar excess of diol will allow for optimum yields, based on the amount of acids, while accounting for the loss of diol during esterification/condensation.

It is also preferred, as mentioned hereinafore, that the weight ratio of the polyoxyalkylene diimide diacid (e) to dicarboxylic acid (b) be from about 0.05 to about 2.0, preferably from about 0.4 to about 1.4.

It is likewise possible, as described in U.S. Pat. No. 4,556,688, to prepolymerize the aromatic dicarboxylic acid (b) and the diol mixture (a) to form a prepolyester. Forming the prepolyester of (a) and (b) can be achieved by conventional esterification techniques as described in U.S. Pat. Nos. 2,465,319; 3,047,439 and 2,910,466, all of which are incorporated herein by reference. This prepolyester can then be reacted with the diimide diacid (e) and the diol mixture (a) to form the polyetherimide ester containing ester segments of the prepolyester.

In its preferred embodiments, the polymer of the present invention will comprise the reaction products of dimethyl terephthalate, optionally with up to about 40 mole percent of another dicarboxylic acid; a mixture of a high molecular weight hydroxy terminated polylactone and a low molecular weight diol, preferably butanediol or a mixture of butanediol with cyclohexane dimethanol or butenediol as the low molecular weight diol; and either (1) a high molecular weight poly(oxy alkylene) diamine and trimellitic anhydride, or (2) a high molecular weight polyoxyalkylene diimide diacid derived from trimellitic anhydride and a high molecular weight poly(oxy alkylene)diamine.

The polyetherimide esters of the instant invention contain at least the following two general recurring structural units:

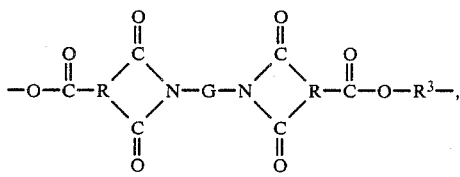

V.

and

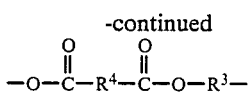

wherein:
R and G are as defined hereinfaore;
R³ is the residue of the diol absent the two hydroxyl groups; and
R⁴ is the residue of the dicarboxylic acid absent the two carboxyl groups.

Since in the practice of the present invention the diol component is a mixture of a low molecular weight diol and a high molecular weight hydroxy terminated polylactone, structural units V and VI are, in general, comprised of two sub-units, i.e., one wherein $R^3$ is the residue of the low molecular weight diol absent the two hydroxyl groups and one wherein $R^3$ is the residue of the high molecular weight hydroxy terminated polylactone absent the two hydroxyl groups. Thus, the polyetherimide esters of the instant invention generally contain at least the following four recurring structural units:

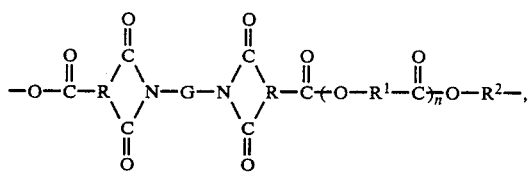

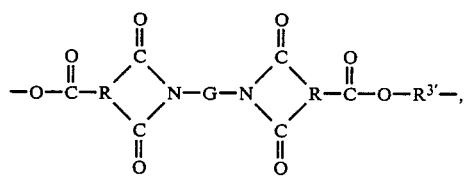

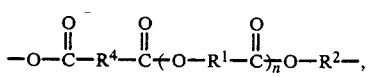

and

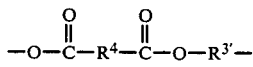

wherein:
R, R¹, R², G, R⁴ and n are as defined hereinafore; and
R³' is the residue of the low molecular weight diol absent the two hydroxyl groups.

Since, in the present invention, the amount of the high molecular weight hydroxy terminated polylactone present in the diol mixture (a) is from about 3 to about 75 weight percent, and since the amount of units of Formulae Va and VIa is generally related to the amount of the high molecular weight hydroxy terminated polylactone present, the combined or total amounts of recurring structural units Va and VIa present is from about 3 to about 75 weight percent, based on the total amounts, by weight, of units of Formulae Va, Vb, VIa and VIb present.

It is to be understood that under certain circumstances, particularly when utilizing processes other than the one-pot process described above, polyetherimide esters of the instant invention can be produced which are comprised of less than all four of the recurring structural units Va-VIb, but in no case less than two recurring structural units of either Formulae Va and VIb or Vb and VIa. Thus, for example, if the polyoxyalkyleneether diimide ester, i.e., V is first prepolymerized separately (by the reaction of the diol, poly(oxy alkylene) diamine, and the tricarboxylic acid) utilizing only one diol of the diol mixture, e.g. a low molecular weight diol, and the polyester, VI, is then polymerized utilizing the diol mixture of the low molecular weight diol and the high molecular weight hydroxy terminated polylactone, then the polymer of the present invention will contain the three recurring structural units represented by Formulae Vb, VIa and VIb.

Conversely, if the polyester VI is first prepolymerized separately (by the reaction of the dicarboxylic acid and the diol) using only one diol of the diol mixture, e.g., the low molecular weight diol, and the polyalkyleneether diimide ester V is then polymerized using the diol mixture of the low molecular weight diol and the high molecular weight hydroxy terminated polylactone, then the polyetherimide ester polymer of the instant invention will contain the three recurring structural units represented by Formulae Va, Vb and VIb.

In the process of the present invention for the preparation of the instant polymers, particularly where all of the reactants are charged to the reactor together or where the polyoxyalkylene diimide diacid is preformed and excess tricarboxylic acid is present, a minor amount of tricarboxylic acid or anhydride thereof may react with the available hydroxyl groups and ultimately function as a branching agent in the finished polymer. Within limits, the degree of branching can be controlled by varying the mole ratio of tricarboxylic acid (d) to the poly(oxy alkylene)diamine (c). An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching it should be noted that polymers of this invention, when prepared from the preformed diimide diacids, are substantially free of branching. If branching is desired, one needs only to introduce a branching agent such as trimellitic anhydride along with the preformed diimide diacid. The amount of branching agent will generally be less than about 0.15 mole per mole of diimide diacid.

Additionally, while not required, it is customary and preferred to utilize a catalyst or catalyst system in the process for the production of the polyetherimide esters of the present invention. In general, any of the known ester-interchange and polycondensation catalysts may be used. Although two separate catalysts may be used, one for ester interchange and one for polycondensation, it is preferred, where appropriate, to use one catalyst for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the polymer.

Exemplary of suitable known catalysts there may be given the acetates, carboxylates, hydroxides, oxides, alcoholates or organic complex compounds of zinc, manganese, antimony, cobalt, lead, calcium, and the alkali metals insofar as these compounds are soluble in the reaction mixture. Specific examples include zinc acetate, calcium acetate, and combinations thereof with anitmony tri-oxide and the like. These catalysts, as well as additional useful catalysts are described in U.S. Pat. Nos. 2,465,319; 2,534,028; 2,850,483; 2,892,815; 2,937,160; 2,998,412; 3,047,549; 3,110,693 and 3,385,830 among others, incorporated herein by reference.

Where the reactants and reaction conditions allow it is preferred to use the titanium catalysts including the inorganic and organic titanium containing catalysts, such as those described, for example, in U.S. Pat. Nos. 2,720,502; 2,727,881; 2,729,619; 2,822,348; 2,906,737; 3,047,515; 3,056,817; 3,056,818 and 3,075,952, all of which are incorporated herein by reference. Especially preferred are the organic titanates such as tetra-butyl titanate, tetra-isopropyl titanate, and tetra-octyl titanate and the complex titanates derived from alkali or alkaline earth metal alkoxides and titanate esters, most preferably organic titanates. These too may be used alone or in combination with other catalysts such as for example, zinc acetate, calcium acetate, magnesium acetate or antimony trioxide, and/or with a catalyst quencher as described above. The catalyst should be used in catalytic amounts, i.e., from about 0.005 to about 2.0 weight percent based on total reactants.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetherimide esters of this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688, incorporated herein by reference.

The instant compositions can be stabilized against ultraviolet radiation by the addition thereto of the well known ultraviolet radiation stabilizers such as, for example, the derivatives of benzophenone, benzotriazoles, the cyanoacrylates, and the like.

Further, the properties of these polymers can be modified by optionally incorporating therein conventional and well known fillers such as carbon black, silica gel, alumina, clays, talc, and chopped fiberglass or glass particles. These may optionally be present in amounts up to about 50 weight percent, preferably up to about 30 weight percent.

A second embodiment of the instant invention is utilizing as the diol component (a) only the high molecular weight hydroxy terminated polylactone. In this embodiment the diol component (a) does not contain any low molecular weight diol. In this embodiment the polyetherimide ester polymer is comprised of the reaction products of:

(i) at least one high molecular weight hydroxy terminated polylactone;
(ii) at least one dicarboxylic acid or an ester forming reactive derivative thereof; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

The polyetherimide esters of this embodiment, since only the high molecular weight hydroxy terminated polylactone is used as the diol component, will be comprised of at least recurring structural units of Formulae Va and VIa.

The polymers of this embodiment exhibit exceptionally good flexibility, i.e., quite low flexural modulus, and very good thermal stability.

DESCRIPTION OF THE PREFERRED EMBODIMENT

The following examples are set forth to more fully and clearly illustrate the present invention. They are presented as illustrative of the present invention and are not to be considered as limiting the invention thereto. In the examples all parts and percentages are on a weight basis unless otherwise indicated.

The following example illustrates a polyetherimide ester polymer falling outside the scope of the instant invention as it is derived from only a low molecular weight diol. This example is presented for comparative purposes only.

EXAMPLE 1

Into a reactor vessel are placed 10.5 parts by weight of butanediol, 9.5 parts by weight of a polyoxyalkylene diimide diacid (prepared by the imidization of trimellitic anhydride with JEFFAMINE D2000, a propylene ether diamine having an average molecular weight of about 2,000, sold by Texaco Chemical Co.), 13.5 parts by weight of dimethyl terephthalate, a phenolic antioxidant, and a titanium catalyst. The mixture is heated to about 180° C. whereupon methanol is generated. After the theoretical amount of methanol is removed the pot temperature is increased to about 250° C. and a vacuum is applied to produce the polyetherimide ester.

The flexural modulus, flexural strength, and tensile elongation of the polymer are determined in accordance with test methods ASTM D790 and ASTM D638 respectively, and the results are set forth in Table I.

The following examples illustrate the polymers of the instant invention.

EXAMPLE 2

This example illustrates a polyetherimide ester derived from butanediol and a high molecular weight hydroxy terminated polycaprolactone.

Into a reactor vessel are placed 185 parts by weight of butanediol, 168 parts by weight of a polyoxyalkylene diimide diacid (prepared by the imidization of trimellitic anhydride with JEFFAMINE D2000, a propylene ether diamine having an average molecular weight of about 2,000), 240 parts by weight of dimethyl terephthalate, 36 parts by weight of poly(caprolactone) diol (average molecular weight of 530, available from Aldrich Chemical Co.), a phenolic antioxidant, and a titanium catalyst. The mixture is heated to about 180° C. whereupon methanol is generated. After the theoretical amount of methanol is removed the pot temperature is increased to about 250° C. and a vacuum applied to produce the polyetherimide ester. The flexural modulus, flexural strength, and tensile elongation are measured and the results are set forth in Table I.

EXAMPLE 3

This example illustrates a polyetherimide ester derived from butanediol and a high molecular weight poly(caprolactone)diol.

Into a reactor vessel are placed 185 parts by weight of butanediol, 168 parts by weight of a polyoxyalkylene diimide diacid (prepared by the imidization of trimellitic anhydride with JEFFAMINE D2000, a propylene ether diamine having an average molecular weight of about 2,000), 240 parts by weight of dimethyl terephthalate, 36 parts by weight of poly(caprolactone)diol (average molecular weight of about 2,000, available from Aldrich Chemical Co.), a phenolic antioxidant, and a titanium catalyst. The mixture is heated to about 180° C. whereupon methanol is generated. After the theoretical amount of methanol is removed the pot temperature is increased to about 250° C. and a vacuum applied to produce the polyetherimide ester. The flexural modulus, flexural strength, and tensile elongation are measured and the results are set forth in Table I.

TABLE I

| Example No. | Flexural Modulus | Flexural Strength | Tensile Elongation |
|---|---|---|---|
| 1 | 24,000 | 1,500 | 160% |
| 2 | 18,900 | 1,200 | 630% |
| 3 | 20,500 | 1,200 | 510% |

In Table I the Flexural Modulus and Flexural strength are in pounds per square inch (psi), and the Tensile Elongation was measured at 2 inches/minute crosshead spead.

The lower the Flexural Modulus and the Flexural Strength the more flexible the polymer, i.e., the better the flexural properties of the polymer. Conversely, the higher the Flexural Modulus and Flexural Strength the less flexible or the stiffer the polymer and, therefore, the poorer the flexural properties.

As illustrated by the data in Table I the polymers of the instant invention are more flexible and, therefore, exhibit better flexural properties than the conventional polyetherimide ester resin of Example 1.

The polymers of the instant invention are useful in the production of extruded and injection molded articles.

Obviously, other modifications and variations of the present invention are possible in light of the above teachings. It is, therefore, to be understood that changes may be made in the particular embodiments described above which are within the full intended scope of this invention as defined by the appended claims.

What is claimed is:

1. A thermoplastic polyetherimide ester polymer comprising the reaction products of:

(i) a diol component comprised of at least one low molecular weight diol and at least one high molecular weight hydroxy terminated polylactone;
(ii) at least one dicarboxylic acid or an ester forming reactive derivative thereof; and
(iii) a set of reactants selected from (a) (1) at least one high molecular weight poly(oxy alkylene)diamine, and (2) at least one tricarboxylic acid or its derivative, or
    (b) at least one high molecular weight polyoxyalkylene diimide diacid.

2. The polymer of claim 1 which exhibits improved flexibility.

3. The polymer of claim 2 wherein the diol component (i) contains an amount of high molecular weight hydroxy terminated polylactone at least effective to improve the flexibility of said polymer.

4. The polymer of claim 3 wherein said diol component (i) contains at least about 3 weight percent of said high molecular weight hydroxy terminated polylactone, based on the total amounts of low molecular weight diol and said polylactone present.

5. The polymer of claim 4 wherein said diol component (i) contains at least about 5 weight percent of said high molecular weight hydroxy terminated polylactone.

6. The polymer of claim 5 wherein said diol component (i) contains at least about 10 weight percent of said high molecular weight hydroxy terminated polylactone.

7. The polymer of claim 1 wherein said low molecular weight diol has a molecular weight of about 250 or less.

8. The polymer of claim 7 wherein said high molecular weight hydroxy terminated polylactone has an average molecular weight of at least about 400.

9. The polymer of claim 8 wherein said high molecular weight hydroxy terminated polylactone has an average molecular weight of at least about 600.

10. The polymer of claim 9 wherein said high molecular weight hydroxy terminated polylactone has an average molecular weight of at least about 900.

11. The polymer of claim 7 wherein said low molecular weight diol is selected from aliphatic diols.

12. The polymer of claim 11 wherein said low molecular weight diol is selected from butanediol, butenediol, hexanediol, cyclohexane dimethanol, or mixtures thereof.

13. The polymer of claim 11 wherein said low molecular weight diol is 1,4-butanediol.

14. The polymer of claim 8 wherein said high molecular weight hydroxy terminated polylactone is polycaprolactone.

15. The polymer of claim 1 wherein said dicarboxylic acid is selected from aromatic dicarboxylic acids or their ester forming reactive derivatives.

16. The polymer of claim 15 wherein said aromatic dicarboxylic acid is dimethyl terephthalate.

17. The polymer of claim 1 wherein (iii) is (a).

18. The polymer of claim 17 wherein said poly(oxy alkylene)diamine (iii)(a)(1) is represented by the formula

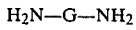

wherein C is the divalent radical remaining after the removal of the amino groups from a long chain polyoxyalkylene diamine, and said poly(oxy alkylene)diamine has an average molecular weight of from about 600 to about 12,000.

19. The polymer of claim 18 wherein said poly(oxy alkylene)diamine has an average molecular weight of from about 900 to about 4,000.

20. The polymer of claim 19 wherein said poly(oxy alkylene)diamine is selected from poly(propylene ether)diamine, poly(ethylene ether)diamine, poly(tetramethylene ether)diamine, copoly(propylene ether-ethylene ether)diamine, or mixtures thereof.

21. The polymer of claim 17 wherein said tricarboxylic acid (iii)(a)(2) is represented by the formula

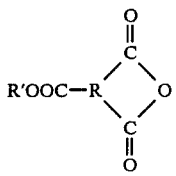

wherein R is a $C_2$ to $C_{20}$ trivalent aliphatic or cycloaliphatic organic radical or a $C_6$ to $C_{20}$ trivalent aromatic organic radical; and R' is hydrogen, $C_1$ to $C_6$ aliphatic or cycloaliphatic monovalent organic radical, or $C_6$ to $C_{12}$ aromatic monovalent organic radical.

22. The polymer of claim 21 wherein R' is hydrogen and R is a $C_6$ aromatic trivalent hydrocarbon radical.

23. The polymer of claim 21 wherein said tricarboxylic acid is trimellitic anhydride.

24. The polymer of claim 1 wherein (iii) is (b).

25. The polymer of claim 24 wherein said polyoxyalkylene diimide diacid (iii)(b) is represented by the formula

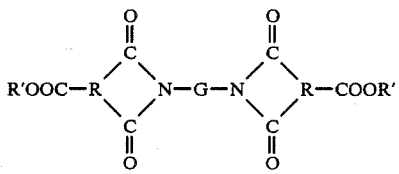

wherein:
each R is independently selected from $C_2$ to $C_{20}$ aliphatic or cycloaliphatic trivalent organic radicals or $C_6$ to $C_{20}$ aromatic trivalent organic radicals;
each R' is independently selected from hydrogen, $C_1$ to $C_6$ aliphatic or cycloaliphatic monovalent organic radicals or $C_6$ to $C_{12}$ aromatic monovalent organic radicals; and
G is the radical remaining after the removal of the amino groups of a high molecular weight poly(oxy alkylene)diamine having an average molecular weight of from about 600 to about 12,000.

26. The polymer of claim 25 wherein G is the radical remaining after the removal of the amino groups of a high molecular weight poly(oxy alkylene) diamine having an average molecular weight of from about 900 to about 4,000.

27. The polymer of claim 26 wherein R is a $C_6$ aromatic trivalent hydrocarbon radical.

28. The polymer of claim 27 wherein R' is hydrogen.

29. A thermoplastic polyetherimide ester polymer comprised of the reaction products of:
(i) at least one high molecular weight hydroxy terminated polylactone;

(ii) at least one dicarboxylic acid or an ester forming reactive derivative thereof; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

30. The polymer of claim 29 wherein said high molecular weight hydroxy terminated polylactone has an average molecular weight of at least about 400.

31. The polymer of claim 30 wherein said high molecular weight hydroxy terminated polylactone has an average molecular weight of at least about 600.

32. The polymer of claim 31 wherein said high molecular weight hydroxy terminated polylactone has an average molecular weight of at least about 900.

33. The polymer of claim 32 wherein said polylactone is polycaprolactone.

34. The polymer of claim 29 wherein said dicarboxylic acid is an aromatic dicarboxylic acid or its ester forming recative derivative.

35. The polymer of claim 34 wherein said aromatic dicarboxylic acid is dimethyl terephthalate.

36. The polymer of claim 29 wherein (iii) is (a).

37. The polymer of claim 36 wherein said high molecular weight poly(oxy alkylene)diamine (iii)(a)(1) is represented by the formula $$H_2N-G-NH_2$$

wherein G is the idvalent residue of a long chain polyoxyalkylene dimaine absent the two amino groups, and said poly(oxy alkylene)diamine has an average molecular weight of from about 600 to about 12,000.

38. The polymer of claim 37 wherein said poly(oxy alkylene) diamine has an average molecular weight of from about 900 to about 4,000.

39. The polymer of claim 36 wherein said tricarboxylic acid (iii)(a)(2) is represented by the formula

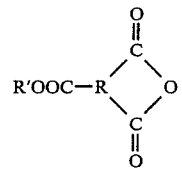

wherein R is a $C_2$ to $C_{20}$ aliphatic or cycloaliphatic trivalent organic radical or a $C_6$ to $C_{20}$ aromatic trivalent organic radical; and R' is hydrogen, $C_1$ to $C_6$ aliphatic or cycloaliphatic monovalent organic radical, or $C_6$ to $C_{12}$ aromatic monovalent organic radical.

40. The polymer of claim 39 wherein said tricarboxylic acid is trimellitic anhydride.

41. The polymer of claim 29 wherein (iii) is (b).

42. The polymer of claim 41 wherein said high molecular weight polyoxyalkylene diimide diacid is represented by the formula

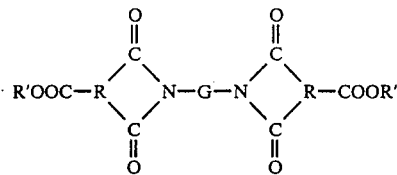

wherein:
R is independently selected from $C_2$ to $C_{20}$ aliphatic or cycloaliphatic trivalent organic radicals or $C_6$ to $C_{20}$ aromatic trivalent organic ardicals;
R' is independently selected from hydrogen, $C_1$ to $C_6$ aliphatic or cycloaliphatic monovalent organic radicals or $C_6$ to $C_{12}$ aromatic monovalent organic radicals; and
G is the divalent radical remaining after the removal of the amino groups of a long chain poly(oxy alkylene) diamine having an average molecular weight of from about 600 to about 12,000.

43. The polymer of claim 42 wherein said G is the divalent radical remaining after the removal of the amino groups of a long chain poly(oxy alkylene) diamine having an average molecular weight of from about 900 to about 4,000.

44. The polymer of claim 43 wherein R is a $C_6$ aromatic trivalent hydrocarbon radical.

45. The polymer of claim 44 wherein R' is hydrogen.

* * * * *